United States Patent Office 3,516,793
Patented June 23, 1970

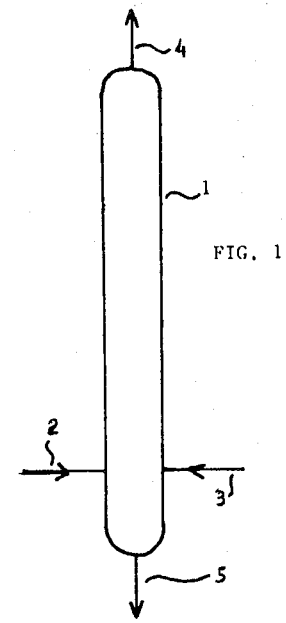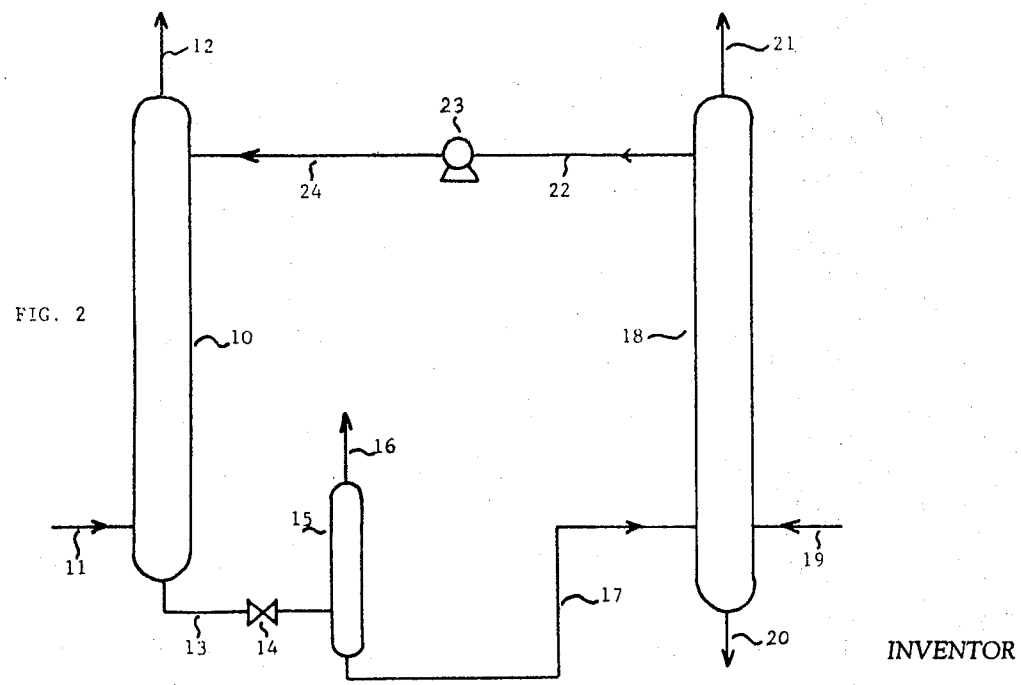

3,516,793
PROCESS FOR PURIFYING SULFIDE CONTAINING GASES AND THE RECOVERY OF SULFUR THEREFROM
Philippe Renault, Neuilly-sur-Seine, France, assignor to Institut Francais du Petrole, des Carburants et Lubrifiants, Rueil-Malmaison, Hauts-de-Seine, France
Filed Sept. 13, 1966, Ser. No. 579,165
Claims priority, application France, Sept. 18, 1965, 31,897
Int. Cl. C01b 17/04
U.S. Cl. 23—225　　　　　　　　　　　　　17 Claims

ABSTRACT OF THE DISCLOSURE

The recovery of sulfur from hydrogen sulfide containing gases by contacting such gases with a solution of an alkanolamine or morpholine in a monoalkyl ether of a polyhydric alcohol to absorb the hydrogen sulfide; and contacting the resultant solution with molecular oxygen to form elemental sulfur.

---

The present invention relates generally to a process for purifying a gas containing sulfide impurities such as hydrogen sulfide and particularly to a process for removing said impurities from a gas by dissolving same in an organic solvent with conversion of the dissolved impurities to sulfur by oxidation.

In a particular embodiment of the present invention a gas containing sulfide impurities is brought into contact with a solution of alkanolamine or morpholine in a monoether of a polyhydric alcohol and the solution is treated by a gas containing molecular oxygen. In a modification of the embodiment an inorganic base is also added to the solution containing dissolved sulfide impurities. After treatment by oxidation sulfur is liberated and separated from the solution.

Prior art processes are known for removing hydrogen sulfide from industrial gases such as by spraying the hydrogen sulfide containing gas with an aqueous solution of alkanolamine. In another development of the prior art, a solution of 7.5–70% by weight of alkanolamine in 30–92.5% by weight of aliphatic acid amide is passed in counter-current exchange with the hydrogen sulfide containing gas and the hydrogen sulfide is removed from the gas. Because of the formation of other byproducts in the solvents of the prior art processes, it has not been possible to obtain a high yield of sulfur.

It is therefore an object of the present invention to provide an improved process for purifying sulfide containing gases.

Another object of the present invention is an improved yield in the recovery of sulfur from sulfide containing gases.

A particular object of the present invention is the removal of hydrogen sulfide from industrial gases by the application of a solution of an alkanolamine in monoether of a polyhydric alcohol.

Another particular object of the invention is the removal of hydrogen sulfide from industrial gases by the application of a solution or morpholine in a monoether of a polyhydric alcohol.

Still another particular object of the invention is the recovery of sulfur from hydrogen sulfide dissolved in a solution of alkanolamine or morpholine in a monoether of a polyhydric alcohol by the application of molecular oxygen.

It is still another particular object of the present invention to regenerate alkanolamine from a sulfate impurity containing solution of alkanolamine in a monoether of a polyhydric alcohol by the application of an inorganic base.

Other objects and the broad concept of the invention will become obvious from a reading of the specification and claims and an inspection of the drawing accompanying the application.

The methods of carrying out the processes of the present invention may best be explained by reference to the accompaying drawings illustrating specific embodiments in which:

FIG. 1 is a diagrammatic showing of a single stage absorption column useful with the present invention; and FIG. 2 is a diagrammatic showing of a two-stage absorption column for carrying out the process of the present invention.

With particular reference to FIG. 1, column 1 contains, for example, a 5% solution of diethanolamine in the monobutyl ether of ethylene glycol and has a conduit 2 feeding a gas containing hydrogen sulfide and a conduit 3 feeding air. The gaseous mixture, freed from the hydrogen sulfide, escapes through conduit 4. The sulfur is removed through conduit 5.

In FIG. 2 the absorption column 10 containing, for example, a 5% solution of diethanolamine in the monobutyl ether of ethylene glycol, is fed by conduit 11 with gas containing carbon dioxide, hydrogen sulfide, and normally gaseous hydrocarbons. The purified gas escapes through conduit 12 and the column is kept under superatmospheric pressure.

The liquid is drawn off through the pipe 13 and delivered through expansion valve 14 to the column 15.

From the head of the column 15 the hydrocarbons which were liquefied or dissolved in the solvent and then vaporized by pressure release are now removed by conduit 16. The liquid in the bottom of column 15 is conducted by pipe 17 to column 18. After introduction of air through conduit 19, the liberated sulfur is removed through conduit 20.

The gaseolus phase (the excess of air containing some hydrocarbons and possibly carbon dioxide) escapes by conduit 21, while the liquid phase is removed through pipe 22 for delivery by compressor 23 through pipe 24 to column 10.

It should be understood that operation under different pressures in the two columns, as described above and shown in FIG. 2, is especially advisable when easily liquefiable hydrocarbons are to be extracted from the gas. If hydrogen sulfide is the only gas to be removed, then both columns can be under the same pressure.

The preferred monoethers of polyhydric alcohols useful in the process correspond to the general formula:

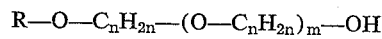

wherein R is an alkyl group containing 1 to 8 carbon atoms, $n$ is equal to 2, 3, or 4 and $m$ is equal to 0, 1, or 2. Examples thereof are:

monomethyl ether of ethylene glycol,
monoisopropyl ether of ethylene glycol,
monohexyl ether of ethylene glycol,
monoethyl ether of propylene glycol-1,2,
monomethyl ether of butylene glycol-1,4,
monomethyl ether of diethylene glycol,
monobutyl ether of diethylene glycol,
monobutyl ether of triethylene glycol,
monomethyl ether of triethylene glycol.

The alkanolamine preferred has the following formula:

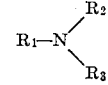

wherein at least one of the $R_1$ to $R_3$ groups is a —$C_pH_{2p}$—OH group in which $p$ is a whole number from 2 to 6 and the other groups are hydrogen, an alkyl group with 1 to 8 carbon atoms, or a —$C_rH_{2r}$—OH group where $r$ is a whole number from 2 to 6.

Suitable examples of the preferred alkanolamines are monoethanolamine, diethanolamine, triethanolamine, monopropanolamine, monoisopropanolamine, butanolamine-1,4, hexanolamine - 1,6, N-methyl-diethanolamine, N-butyl-dipropanolamine, N,N-dimethyl-monoethanolamine and diisopropanolamine.

The use of morpholine is preferred to the substituted forms such as morpholine ethanol, morpholine ethanol ethyl ether and morpholine phenyl.

The gas absorption equipment suitable for use in the present invention is described and illustrated in the "Chemical Engineers' Handbook," of John H. Perry, 2nd edition (1941), pp. 1195–1202, particularly pp. 1196 and 1197. The type of gas absorption equipment preferred for use in the present invention is conventional.

The alkanolamine is advantageously used in amounts of 0.1 to 50% by weight of the glycol monoether, and preferably in amounts of 1 to 10% thereof. If the alkanolamine is used in concentrations higher or lower than the preferred amount, a smaller yield of sulfur results.

A large proportion of alkanolamine is recommended if the gas contains a large proportion of carbon dioxide; for example, when the carbon dioxide varies between 5 and 30 volume percent in the feed gas, the alkanolamine concentration in a monoether of a polyhydric alcohol preferably varies between about 1 and 30 weight percent.

Less than 50% by weight and preferably less than 20% by weight of water can be tolerated in the solution of alkanolamine in a monoether of a polyhydric alcohol.

The molecular oxygen gas feed can be pure oxygen or a mixture of oxygen with an inert gas such as nitrogen. The oxygen concentration can be either greater or less than its amount in air, with a preferred concentration of 5 to 40 volume percent.

The solution of absorbed sulfide impurities in alkanolamine glycol monoether may be treated with oxygen in a separate zone, as shown in FIG. 2, or both the absorption and oxidation treatments may be applied simultaneously in the same reaction zone, as shown in FIG. 1.

Separate treatment, as shown in FIG. 2, is preferred when it is undesirable to introduce oxygen or air into the feed gas being purified. On the contrary, if the presence of oxygen is not objectionable, the operations are preferably performed in a single stage. Such single stage operation is particularly recommended when the gas being purified contains free oxygen.

The proportion of oxygen should be sufficient to assure the conversion of the hydrogen sulfide into sulfur by the following reaction:

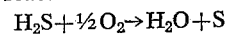

$$H_2S + \tfrac{1}{2} O_2 \rightarrow H_2O + S$$

It is, however, advantageous to use an excess of oxygen, preferably 50 to 5000 volume percent excess.

The sulfur can be separated from the liquid phase in any suitable manner, in either the solid or the liquid state, as by decantation or filtration.

The absorption operations are advantageously performed at a slightly elevated temperature, for example, between 0 and 100° C., preferably between 10 and 50° C., The operation can be conducted under atmospheric pressure or under some other pressure, preferably more elevated than atmospheric pressure. Preferred pressures are between 1 and 100 atmospheres.

For operation under low pressure, for example, under atmospheric pressure, it is preferable to use ethers of glycols and alkanolamines which are only slightly volatile to avoid loss by evaporation. The compounds preferably have normal boiling points between about 170 and 300° C.

The oxidation can be performed in the same temperature and pressure ranges as the absorption step.

The feed gas is any gas which contains sulfide impurities, such as, for example, hydrogen sulfide or mercaptans, even in small proportions. Particularly interesting examples are the purification of industrial gases such as illuminating gas, oven gas, water gas, and natural gas. The hydrogen sulfide concentration of the industrial gases varies from about 0.2 to 100 volume percent.

The composition of a typical natural gas suitable as a feed gas for the present invention has the following composition:

| Component: | Volume percent |
|---|---|
| $H_2S$ | 0.5–30 |
| $CH_4$ | 40–99.5 |
| Other gases | 0–59.5 |

These other gases may be for example ethane, propane, butane and the like, nitrogen, carbon dioxide and hydrogen.

The composition of an oven gas suitable for processing in the present invention has the following composition:

| Component: | Volume percent |
|---|---|
| $H_2S$ | 0.5–10 |
| CO | 4–40 |
| $H_2$ | 1–65 |
| $N_2$ | 0.5–70 |
| Other gases such as $CH_4$, $CO_2$, $O_2$ | 0–30 |

The presence of carbon dioxide is not detrimental, since little of it is retained, especially when the oxidation and the absorption are performed simultaneously. When these two operations are performed separately as in FIG. 2, the carbon dioxide absorbed by the liquid phase is driven from the latter by the oxidizing gas.

If the treated gas contains hydrocarbons that are liquefiable by simple compression, some of the hydrocarbons present in the feed gas can be retained and eventually recovered by heating the solution or relieving the pressure, as shown by the method illustrated in FIG. 2. The hydrocarbons can also be removed by a current of an inert gas. In this way it is possible to effect simultaneously the gasoline recovery and desulfurizing of the industrial gases along with the separation of propane, butane and related gases.

In the oxidation zone of column 18 of FIG. 2 (or in the single reaction zone of column 1 of FIG. 1), a brownish-red coloration is generally observed in the vicinity of the point where the oxidizing gas is admitted, with the color becoming yellow at the end of the contact zone. The first coloration corresponds apparently to the formation of polysulfides, which are eventually converted into yellow sulfur. The existence of a yellow coloration is therefore indicative of satisfactory functioning of the system.

Since the reaction proceeds rapidly, it is generally sufficient to use an apparatus of only small dimensions, such as an absorption column having a diameter of about 2 to 30 cm., and a height of about 50 to 300 cm.

The oxidation of $H_2S$ produces not only elementary sulfur but also certain by-products consisting of oxidation products of sulfur such as thiosulfates, polythionates and even sulfates of the alkanolamines.

At temperatures below 50° C., the amount of byproduct compounds is small as compared with the amount of sulfur that is formed. The accumulation of these impurities, however, reduces the amount of alkanolamine available for the absorption of sulfide gases by the formation of salts that are stable at ordinary temperatures.

To make it possible for the reaction to continue indefinitely, it is necessary to chemically change these products. The simplest method comprises adding an equivalent amount of an inorganic base such as an oxide, a hydroxide, or a carbonate of an alkali metal, an alkaline earth metal, or ammonia, for example, soda, potash, chalk, ammonium hydroxide, or sodium, potassium or ammonium carbonate in concentrated or dilute aqueous solution, or in the dispersed solid state. The best results are obtained with soda or potash in aqueous solutions of concentrations above 5% by weight.

The alkanolamine is thereby regenerated while the impurities form alkali salts which are but slightly soluble in the mixture and separate from the solution when present in larger quantities.

The proportion of basic compounds to be added depends mainly on the conditions of the reaction. It is generally from 0.01% to 10% by weight of the sulfur present in the combined form in the gas being purified.

For example there may be used compositions comprising a solution having 0.1 to 50% by weight of a compound selected from the group consisting of alkanolamines and morpholines with 50-99.899% by weight of monoalkyl ether of a polyhydric alcohol and 0.001 to 1% by weight of an inorganic base.

Another method of removing the by-products above mentioned that can be used in combination with the preceding method comprises heating the alkanolamine to a temperature between 70 and 200° C., preferably between 100 and 130° C. in a nonoxidizing atmosphere.

Certain compounds of sulfur are effectively decomposed at these temperatures, and especially at the fusion temperature of sulfur.

It is then possible, by collecting the sulfur in the molten state, to partially regenerate the solution for a more economical use of the basic compounds.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

Example 1

The air that is to be purified is contaminated with $H_2S$ and $CO_2$ and has the following composition by volume:

| | Percent |
|---|---|
| $H_2S$ | 2.5 |
| $CO_2$ | 5 |
| $O_2$ | 18.5 |
| $N_2$ | 74 |

This gas at 30° C. is passed at the rate of 50 liters per hour into 100 cm.³ of a solution of 5% by volume of diethanolamine in monobutyl ether of ethylene glycol contained in an absorption apparatus such as shown in FIG. 1.

The exhaust gas has the following composition by volume:

| | Percent |
|---|---|
| $H_2S$ (not detectable by lead acetate). | |
| $CO_2$ | 5.2 |
| $O_2$ | 17.9 |
| $N_2$ | 76.9 |

The yield of sulfur is quantitative.

After about 5 hours of this treatment, the conversion of $H_2S$ to sulfur is no longer total and gradually diminishes.

Example 2

The process of Example 1 is repeated but with the introduction into the ethanolamine solution of 1 cc./hour of an aqueous solution of 70 g. sodium carbonate per liter.

After 50 hours the conversion of $H_2S$ is still total.

Example 3

A gas having the following composition is treated in a two column apparatus as shown in FIG. 2:

| | Percent |
|---|---|
| $CH_4$ | 91 |
| $H_2S$ | 9 |

The absorption of the sulfide by a 5 volume percent solution of diethanolamine in the monomethyl ether of ethylene glycol is effected in the first column at 25° C. under a pressure of 10 kg./cm.². The delivery of gas to the inlet is 11 liters/hour under normal conditions, while the solvent is supplied at the rate of 0.2 liter/hour. The yield is 9.5 liters/hour of methane which has no reaction with lead acetate.

An expansion of the solvent withdrawn from the first column to a pressure of 1 kg./cm.² produced 0.45 liter/hour of methane.

The oxidation occurs in column 18 at the base of which 40 liters/hour of air are injected.

The hydrogen sulfide is converted into sulfur. The gaseous efflux from column 18 has approximately the following composition by volume:

| | Percent |
|---|---|
| $O_2$ | 18.83 |
| $N_2$ | 81.05 |
| $CH_4$ | 0.12 |

The regenerated solvent is recycled, after compression, into the absorption column 10.

The yield of sulfur is quantitative.

Every six hours 0.5 g. $Na_2CO_3$ are added in the dry state to the solvent to regenerate the latter.

Example 4

10 liters per hour of a solvent formed of 94% (by weight) of monomethyl ether of triethylene glycol, 1% diethanolamine and 5% water is passed into counter-current flow with a gas consisting of 7 liters of $H_2S$ and 150 liters of nitrogen per hour.

The process is performed at 25° C. under atmospheric pressure.

The gas is completely freed from $H_2S$ and the yield of sulfur is quantitative.

The solvent is then treated by counter-current flow in a separate zone by a mixture of 100 liters/hour of air and 0.4 liter/hour of $NH_3$ at 30° C. under atmospheric pressure.

No appreciable deactivation is noticed, even after 50 hours of operation.

Example 5

2000 m.³/hour (volume under normal conditions) of a gas composed of 97% methane, 2% $H_2S$ and 1% $CO_2$ (by volume) are contacted in counter-current flow with a solvent composed of 95% (by weight) of monoethyl ether or triethylene glycol and 5% of diethanolamine, used at the rate of 10 M.³ per hour. The process is performed at 30° C. under 10 atmospheres.

The gas is completely freed from $H_2S$.

The liquid phase is expanded to normal pressure and is then contacted by counter-current flow with 750 m.³/hour of air at 40° C. (volume under normal conditions). The liquid phase is continuously regenerated by the addition of 3 kg./hour of soda (dry weight) in 20% aqueous solution by weight.

A practically quantitative yield of molten sulfur is obtained.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

I claim:

1. A process for recovering sulfur from a gas containing hydrogen sulfide as an impurity, comprising contacting said gas with a solution of a compound selected from the group consisting of alkanolamines and morpholines in a monoalkyl ether of a polyhydric alcohol to absorb said impurity in said solution; treating resultant solution with a gas containing molecular oxygen, to form elemental sulfur; and separating said sulfur with the provisions that said compound has a concentration of about 0.1% to 50% of the weight of said monoalkyl ether of a polyhydric alcohol, and said solution having less than 50% by weight water.

2. The process of claim 1, further comprising treating said solution with an inorganic base selected from the group consisting of ammonia; and an oxide, an hydroxide and a carbonate of a cation selected from the group consisting of an alkali metal and an alkaline earth metal.

3. The process of claim 1, wherein said compound has a concentration of about 1 to 10% of the weight of said monoalkyl ether of a polyhydric alcohol.

4. The process of claim 2, wherein said inorganic base is used in the proportion of about 0.01 to 10% by weight based on the combined sulfur content of said feed gas.

5. The process of claim 1, wherein said oxygen treatment is subsequent to said contacting a feed gas with a solution.

6. The process of claim 1, wherein said absorption and oxidation treatments are simultaneous and are performed in the same reaction zone.

7. The process of claim 1, further comprising regenerating said solution by heating to about 70–200° C.

8. The process of claim 7, wherein the temperature of heating is about 100–130° C.

9. A process as defined by claim 1 wherein said monoalkyl ether of a polyhydric alcohol is of the formula;

$$R-O-C_nH_{2n}-(O-C_nH_{2n})_m-OH$$

wherein R is an alkyl group containing 1 to 8 carbon atoms, $n$ is equal to 2, 3 or 4, and $m$ is equal to 0, 1 or 2.

10. A process as defined by claim 1 wherein said monoalkyl ether of a polyhydric alcohol is selected from the group consisting of monomethyl ether of ethylene glycol, monoisopropyl ether of ethylene glycol, monohexyl ether of ethylene glycol, monoethyl ether of propylene glycol-1,2, monomethyl ether of butylene glycol-1,4, monomethyl ether of diethylene glycol, monobutyl ether of diethylene glycol, monoethyl ether of triethylene glycol and monomethyl ether of triethylene glycol.

11. A process as defined by claim 1 wherein said compound is selected from the group consisting of morpholine, morpholine ethanol, morpholine ethanol ethyl ether, and morpholine phenyl.

12. A process as defined by claim 1 wherein said compound is morpholine.

13. A process as defined by claim 1 wherein said compound is an alkanol amine of the formula:

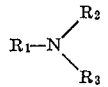

wherein at least one of $R_1$, $R_2$ and $R_3$ represents a $-C_pH_{2p}-OH$ group in which $p$ is a whole number from 2 to 6 and the other R groups are selected from the group consisting of hydrogen, alkyl of 1–8 carbon atoms, and a $-C_rH_{2r}-OH$ group where $r$ is a whole number from 2 to 6.

14. A process as defined by claim 1 wherein said compound is selected from the group consisting of monoethanolamine, diethanolamine, triethanolamine, monopropanolamine, monoisopropanolamine, butanolamine-1,4, hexanolamine-1,6, N-methyl-diethanolamine, N-butyl-dipropanolamine, N,N-dimethyl-monoethanolamine and diisopropanolamine.

15. A process as defined by claim 10 wherein said compound is selected from the group consisting of monoethanolamine, diethanolamine, triethanolamine, monopropanolamine, monoisopropanolamine, butanolamine-1,4, hexanolamine-1,6, N-methyl-diethanolamine, N-butyl-dipropanolamine, N,N-dimethyl-monoethanolamine and diisopropanolamine.

16. A process as defined by claim 10 wherein said compound is morpholine.

17. A process as defined by claim 1, wherein said solution consists essentially of said compound in said monoalkyl ether of a polyhydric alcohol.

References Cited

UNITED STATES PATENTS

| | | | |
|---|---|---|---|
| 2,946,652 | 7/1960 | Bloch | 23—3 |
| 3,170,766 | 2/1965 | Townsend | 23—3 X |
| 2,177,068 | 10/1939 | Hutchinson | 23—3 |
| 2,395,509 | 2/1946 | Shaw | 23—2 |
| 3,097,925 | 7/1963 | Pitts et al. | 23—225 |
| 3,103,411 | 9/1963 | Fuchs | 23—226 |
| 3,240,833 | 3/1966 | Cash | 23—3 |

FOREIGN PATENTS

| | | |
|---|---|---|
| 670,700 | 4/1952 | Great Britain. |
| 752,372 | 7/1956 | Great Britain. |

OSCAR R. VERTIZ, Primary Examiner

G. O. PETERS, Assistant Examiner